United States Patent [19]

Gründken et al.

[11] Patent Number: 4,705,160

[45] Date of Patent: Nov. 10, 1987

[54] SCRAPER-CHAIN CONVEYORS FOR MINERAL MINING

[75] Inventors: Dieter Gründken; Manfred Redder, both of Lünen; Hartmut Schewinski, Kamen-Westick, all of Fed. Rep. of Germany

[73] Assignee: Gewerkschaft Eisenhutte Westfalia, Lunen, Fed. Rep. of Germany

[21] Appl. No.: 928,667

[22] Filed: Nov. 6, 1986

Related U.S. Application Data

[63] Continuation of Ser. No. 694,018, Jan. 23, 1985, abandoned.

[30] Foreign Application Priority Data

Feb. 11, 1984 [DE] Fed. Rep. of Germany ....... 3404898

[51] Int. Cl.[4] ............................................. B65G 19/28
[52] U.S. Cl. .................................. 198/735; 198/860.3
[58] Field of Search ............................. 198/735, 860.3

[56] References Cited

U.S. PATENT DOCUMENTS 4,624,362 11/1986 Temme et al. ...................... 198/735

FOREIGN PATENT DOCUMENTS

| 1258333 | 1/1968 | Fed. Rep. of Germany | 198/735 |
| 1405095 | 9/1975 | United Kingdom | 198/735 |
| 1483593 | 8/1977 | United Kingdom | 198/735 |
| 213670 | 5/1968 | U.S.S.R. | 198/735 |
| 442309 | 4/1975 | U.S.S.R. | 198/735 |

*Primary Examiner*—Joseph E. Valenza
*Assistant Examiner*—Jonathan D. Holmes
*Attorney, Agent, or Firm*—Samuels, Gauthier, Stevens & Kehoe

[57] ABSTRACT

A composite floor plate assembly for locating between side walls of a pan of a scraper-chain conveyor has an access plate fitted into an aperture in a floor plate proper. A locking bar secures the access plate in position. The access plate has the same thickness as the floor plate but lies wholly flush with the floor plate as does the locking bar and the fixings to prevent collision with the scraper-chain assembly.

14 Claims, 3 Drawing Figures

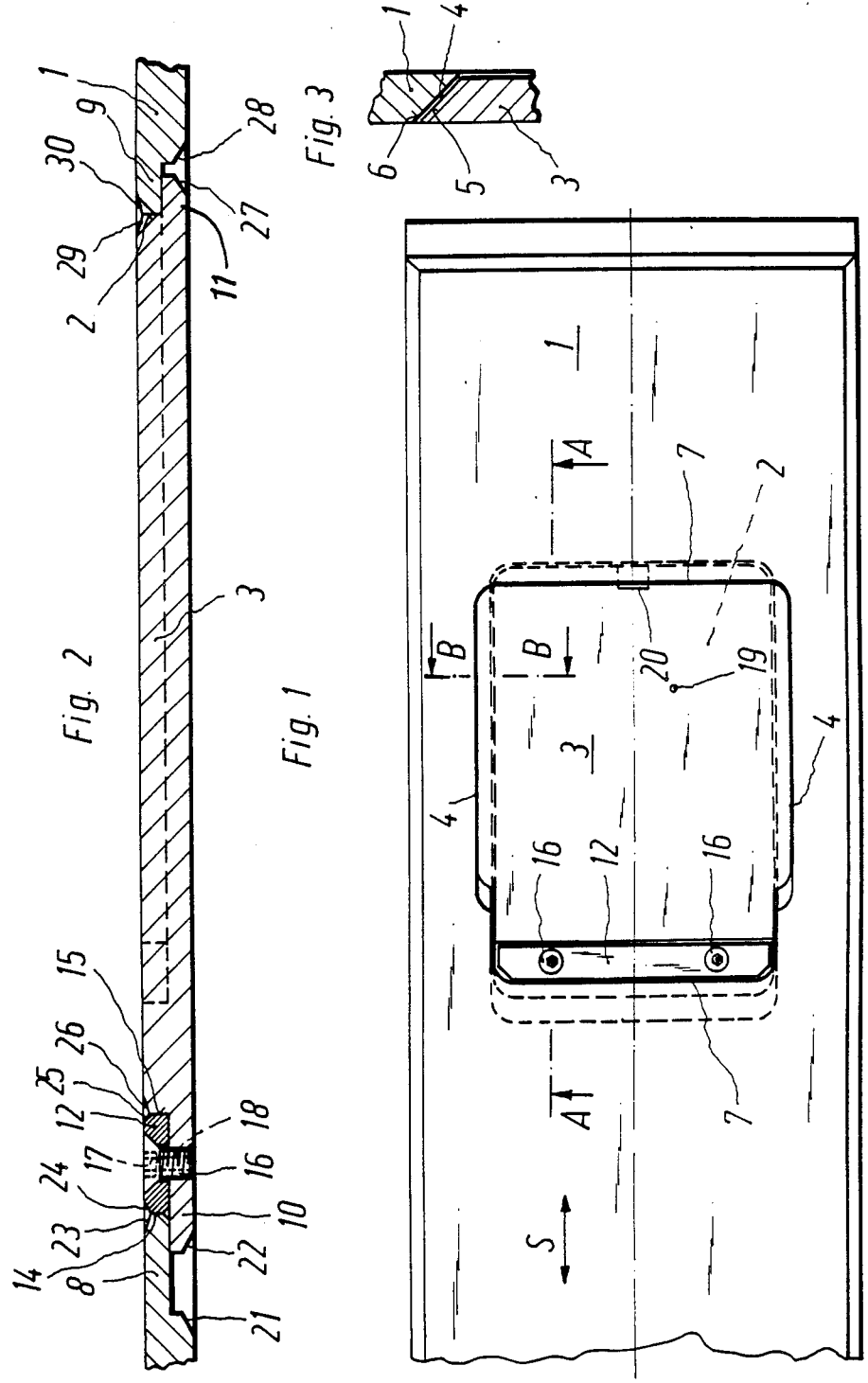

SCRAPER-CHAIN CONVEYORS FOR MINERAL MINING

This is a continuation of co-pending application Ser. No. 694,018 filed on Jan. 23, 1985, now abandoned.

FIELD OF THE INVENTION

The present invention relates in general to scraper-chain conveyors as used in mining and particularly to the construction of individual channel sections or pans of such conveyors.

BACKGROUND TO THE INVENTION

It is well known to utilize a series of pans joined end-to-end in the construction of scraper-chain conveyors and to adopt as a pan construction a pair of shaped side walls adjoined at their central regions by a floor plate. The floor plates of the pans combine to form a bed along which material is transferred by the circulation of a scraper-chain assembly above the pans. The scraper-chain assembly moves along the pans in an upper conveying run and a lower return run. The lower run can be closed off from beneath by base plates. To permit access to the return run, it is known to provide a cut-out or aperture in the floor plates of some of the pans and to close off these apertures with removable inserts. German patent specification No. 1258333 describes a known construction of this type. In this arrangement, the insert is supported by means which projects into the lower run. The scrapers of the scraper-chain assembly are prone to impact on the support means which causes undue wear to the chain or chains and these collisions can cause severe damage.

A general object of the present invention is to provide an improved floor plate assembly for use in conveyors.

SUMMARY OF THE INVENTION

According to the invention, a floor plate proper of a scraper-chain conveyor has an aperture receiving an access plate as is known per se. The access plate is fixed in position by securing means and the invention is characterized in that nothing protrudes or projects beyond the floor plate that is particularly above or below the floor plate. In this way, there is absolutely no danger of collisions with the scraper-chain assembly and the combined floor plate with removable access plate can be used to advantage in a conveyor in a trouble-free manner with a long operating life.

The aperture and access plate can be rectangular and desirably the access plate has the same thickness as the floor plate. In a preferred construction, the sides of the access plate and the sides of the margin of the aperture are bevelled to support one another and the end regions of the margin of the aperture and the access plate have shaped step-like profiles defining tongues which lie one above another.

The access plate can be made to lie partly over and partly under the floor plate.

The access plate itself can be displaced within the aperture for removal or on installation. The securing means may then function to impede this free displacement. The free displacement of the access plate may be longitudinally and the engaging tongues at one end region may then be longer than those at the other end region. The shorter tongues can thus be brought out of engagement by displacement towards the longer tongues. The access plate can be lifted clear by lifting upwards from its other end region. A small aperture in the access or floor plate can facilitate leverage of the access plate for its removal.

The securing means may be a locking bar fitted into a gap between the end of one longer tongue and the base of a recess overlying the end of another longer tongue overlapping therewith. The bar can best be fitted with the aid of counter-sunk screws preserving the flush nature of the access plate.

To further preclude the possibility of damage or impact, all the junction edges between the access plate, the reception aperture and its locking bar are best chamfered. To detect chain fractures, the access plate and/or the locking bar and/or its fixing screws may have inspection bores through which a wire can be placed to 'feel' the chain integrity.

The invention may be understood more readily, and various other aspects and features of the invention may become apparent, from consideration of the following description.

BRIEF DESCRIPTION OF DRAWING

An embodiment of the invention will now be described, by way of example only, with reference to the accompanying drawing, wherein:

FIG. 1 is a plan view of a region of a floor plate assembly constructed in accordance with the invention;

FIG. 2 is a sectional elevation of part of the assembly shown in FIG. 1, the view being taken along the line A—A in FIG. 1 and on a somewhat larger scale; and FIG. 3 is a sectional end view of part of the assembly shown in FIG. 1, the view being taken along the line B—B in FIG. 1 and on a somewhat larger scale.

DESCRIPTION OF PREFERRED EMBODIMENT

The accompanying drawing depicts a floor plate assembly for use in a scraper-chain conveyor. As is known, such a conveyor is constructed from a series of channel sections or pans arranged end-to-end. Each pan is itself composed of a pair of side walls with a floor plate therebetween. One or more of the pans utilizes as its floor plate the composite assembly as now described. The assembly is composed of a floor plate having a rectangular aperture 2 which is enclosed by means of a removable access plate 3. The longitudinal sides 4 of the margin of the aperture 2 and of the access plate 3 which extend in the conveying direction (arrows S) are bevelled over part of their length at an angle of about 45 degrees. The bevelled side faces 5 of the access plate 3 are thus supported by the correspondingly bevelled side faces 6 of the margin of the aperture 3 as shown in FIG. 3. The ends 7 of the margin of the aperture 2 and of the access plate 3 which extend transversally of the conveying direction are stepped so that the floor plate 1 has tongues 8,9 which project over tongues 10,11 of the access plate 3 as shown in FIG. 2. The tongues 8,10 at one end are longer than the tongues 9,11 at the other so that the plate 3 can be displaced along the aperture 2 to disengage the tongue 11 to permit the plate 3 to be removed or installed. The side faces 6 of the aperture 2 are made correspondingly longer than the side faces 5 of the plate 3 as shown in FIG. 1, and these faces 5,6 terminate beyond the tongues 8,9,10,11. The plate 3 and the aperture 2 are thus narrower over their end regions where the tongues 8,9,10,11 are formed. A detachable locking bar 12 is used to secure the access plate 3 in position. As shown in FIG. 2, the various junction edges 21-30 between the floor plate 1, the access plate 3, and the locking bar 12 are all chamfered and the plate 3 and bar 12 together with its fixings 16 lie flush with the plate 1.

In order to install the access plate 3 within the open aperture 2, the plate 3 is orientated to bring the tongues 11, 10 into correspondence with the tongues 9,8 respectively. The plate 3 is then shifted to the left of FIG. 1 to bring the tongue 10 beneath the tongue 8 to the maximum extent. The plate 3 is then tilted down to bring the tongue 11 beneath the tongue 9 and the plate 3 is shifted to the right of FIG. 1. The engaging faces 5,6 prevent the plate 3 from passing through the aperture 2 while the tongues 8, 9, 10, 11 prevent the plate 3 from being lifted. The combination of the tongues 8, 9, 10, 11 and the side faces 5,6 prevent the plate 3 from moving laterally. The plate 3 can, however, be removed by displacement again to the left of FIG. 1 to free the tongue 11. To secure the plate 3 and prevent this movement from occuring inadvertently, the aforementioned locking bar 13 is located from above in the space 13 between the face end 14 of the tongue 8 and the opposite face 15 of the recess in the plate 3 above the tongue 10. The bar 12 is fixed to the upper side of the tongue 10 with the aid of two countersunk "Allen" type screws 16 with hexagonal bores 17 for tightening and loosening, with a key. The screws 16 fix into threaded bores within the tongue 10. Conveniently, the bores 17 within the heads of the screws 16 are prolonged into through bores 18. One or more bores 19 are also provided in the plate 3. The bores 17, 18, 19 permit inspection of the lower run of the conveyor and, for example enable a chain fracture in the lower run of the conveyor employing the floor plate assembly to be detected by probing with a wire or the like.

When it is desired to open the floor plate assembly, say in the event of a fracture, the screws 16 are removed, the bar 12 is withdrawn and the plate 13 is shifted to the left of FIG. 1. To facilitate the necessary raising of the plate 3 from the opposite end to its tongue 10 a recess 20 in the access plate 3 and/or the floor plate permits a lever or the like to be used.

We claim:

1. In or for a scraper-chain conveyor; a floor plate assembly comprising a continuous floor plate, an aperture in the floor plate bordered by confronting first and second end edges and confronting first and second side edges, said first and second end edges having downwardly facing recesses and said first and second side edges providing support surfaces, a removeable access plate fitted directly in the aperture of the floor plate and resting on said support surfaces thereby to close said aperture, the aperture and the access plate being dimensioned to permit the access plate to be received in the aperture and to be displaced in the plane of the aperture and relative to the floor plate into an installed position at which one portion of the access plate underlies said first end edge and is received in the downwardly facing recess thereof and another portion of the access plate underlies said second end edge and is received in the downwardly facing recess thereof and cooperates with said second end edge to define an upwardly facing recess, and securing means positioned in said upwardly facing recess to secure the access plate in said installed position, said securing means being detachable from both the access plate and the assembly to permit the access plate to be displaced relative to the floor plate in the plane of the aperture and to be removed while leaving the remainder of the assembly intact; wherein neither the securing means nor the access plate projects outwardly beyond the upper and lower faces of the floor plate itself, so that when installed, the access plate and securing means do not intrude into the spaces above and below the floor plate.

2. An assembly according to claim 1, wherein the access plate and the floor plate have the same thickness.

3. An assembly according to claim 1, wherein the aperture is rectangular.

4. An assembly according to claim 3, wherein the first and second side edges of the aperture are bevelled to engage in a mutually supportive relationship with bevelled side edges on the access plate.

5. An assembly according to claim 3, wherein the first and second end edges of the aperture and end edges on the recess plate are stepped to provide tongues which engage beneath one another.

6. An assembly according to claim 4, wherein the end edges of the aperture and end edges on the access plate are stepped to provide tongues which engage beneath one another.

7. An assembly according to claim 6, wherein the tongues at one end region of the aperture and the access plate are longer than those at the other end region, the access plate is displaceable within the aperture for installation or removal to free the tongues at said other end region and the securing means prevents such displacement.

8. An assembly according to claim 7, wherein tongues of the access plates engage beneath the tongues of the aperture and the securing means is a bar which is fitted to the tongue of the access plate at said one region to fill the space between the end face of the tongue of the aperture and the end face of a recess above the tongue of the access place.

9. An assembly according to claim 8, wherein countersunk screws serve to fix the bar to the access plate tongue.

10. An assembly according to claim 8, wherein all the juncture edges of the floor plate aperture, the access plate and the bar are chamfered.

11. An assembly according to claim 8, wherein the access plate has an aperture at the other end region for facilitating the raising and removal of the plate from said other region.

12. An assembly according to claim 8, wherein the floor plate has another aperture adjacent the aperture for facilitating the raising and removal of the plate from said other region.

13. An assembly according to claim 9, wherein the screws have through bores for permitting inspection of the lower region of the conveyor during use.

14. An assembly according to claim 1, wherein the access plate has one or more bores for permitting inspection of the lower region of the conveyor during use.

* * * * *